(12) United States Patent
Herrmann et al.

(10) Patent No.: US 10,527,172 B2
(45) Date of Patent: Jan. 7, 2020

(54) INTERNAL COMBUSTION ENGINE AND METHOD FOR ASSEMBLING AN INTERNAL COMBUSTION ENGINE

(71) Applicant: Volkswagen Aktiengesellschaft, Wolfsburg (DE)

(72) Inventors: Julian Herrmann, Wolfsburg (DE); Andre Kuphal, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 1 day.

(21) Appl. No.: 15/884,648

(22) Filed: Jan. 31, 2018

(65) Prior Publication Data

US 2018/0149270 A1 May 31, 2018

Related U.S. Application Data

(63) Continuation of application No. PCT/EP2016/067692, filed on Jul. 25, 2016.

(30) Foreign Application Priority Data

Aug. 3, 2015 (DE) .......................... 10 2015 214 725

(51) Int. Cl.
*F01L 1/34* (2006.01)
*F16J 15/16* (2006.01)
(Continued)

(52) U.S. Cl.
CPC .............. *F16J 15/16* (2013.01); *F01L 1/024* (2013.01); *F01L 1/047* (2013.01); *F01L 1/3442* (2013.01);
(Continued)

(58) Field of Classification Search
CPC ......... F02F 7/006; F01L 1/024; F01L 1/3442; F01L 1/047; F01L 2001/34433; F16H 53/04; F16H 7/02; F16J 15/16; F16C 3/06
See application file for complete search history.

(56) References Cited

U.S. PATENT DOCUMENTS

| | | | | |
|---|---|---|---|---|
| 4,974,560 A | * | 12/1990 | King | F01L 1/26 123/90.17 |
| 2003/0062008 A1 | | 4/2003 | Gramkow et al. | |
| 2014/0150742 A1 | | 6/2014 | Kinouchi | |

FOREIGN PATENT DOCUMENTS

DE           101 48 059 A1    4/2003
DE    10 2009 025 603 A1    1/2010
(Continued)

OTHER PUBLICATIONS

Search Report including Provisional Assessment of Patentability issued by the German Patent and Trademark Office for German Patent Application No. DE 10 2015 214 725.8, dated Mar. 3, 2016.
(Continued)

*Primary Examiner* — Zelalem Eshete
(74) *Attorney, Agent, or Firm* — Manfred Beck, P.A.

(57) ABSTRACT

An internal combustion engine includes an engine housing and a valve drive with a camshaft, a phase adjuster operatively connected to the camshaft, and an actuator for actuating the phase adjuster. The phase adjuster and the actuator delimit an interior space. A cover surrounds the phase adjuster. An actuator holder is provided for fastening the actuator to the engine housing, wherein the actuator holder is surrounded by the cover. A sealing element is disposed between the phase adjuster and the actuator holder. The sealing element seals the interior space against liquid discharge. A method for assembling an internal combustion engine is also provided.

17 Claims, 5 Drawing Sheets

(51) Int. Cl.
    *F01L 1/02*     (2006.01)
    *F01L 1/344*     (2006.01)
    *F01L 1/047*     (2006.01)
    *F16H 53/04*     (2006.01)
    *F16C 3/06*     (2006.01)
    *F16H 7/02*     (2006.01)

(52) U.S. Cl.
    CPC ............... *F16H 53/04* (2013.01); *F16C 3/06* (2013.01); *F16H 7/02* (2013.01)

(56) References Cited

FOREIGN PATENT DOCUMENTS

| | | |
|---|---|---|
| DE | 10 2009 020 652 A1 | 11/2010 |
| DE | 10 2013 223 112 A1 | 6/2014 |
| DE | 10 2013 212 935 A1 | 1/2015 |
| EP | 2 816 203 A2 | 12/2014 |
| WO | 2015/000476 A1 | 1/2015 |

OTHER PUBLICATIONS

International Search Report for International Application No. PCT/EP2016/067692 and translation thereof, dated Sep. 29, 2016.
International Preliminary Report on Patentability for International Application No. PCT/EP2016/067692 including Written Opinion of the International Searching Authority and translation thereof, dated Feb. 6, 2018.

\* cited by examiner

INTERNAL COMBUSTION ENGINE AND METHOD FOR ASSEMBLING AN INTERNAL COMBUSTION ENGINE

CROSS-REFERENCE TO RELATED APPLICATIONS

This application is a continuation, under 35 U.S.C. § 120, of copending International Application No. PCT/EP2016/067692, filed Jul. 25, 2016, which designated the United States; this application also claims the priority, under 35 U.S.C. § 119, of German Patent Application No. DE 10 2015 214 725.8, filed Aug. 3, 2015; the prior applications are herewith incorporated by reference in their entirety.

BACKGROUND OF THE INVENTION

Field of the Invention

The invention relates to an internal combustion engine and to a method for assembling such an internal combustion engine.

The valve drive for a (reciprocating piston) internal combustion engine in each case includes at least one, regularly two, inlet and outlet valves for each combustion chamber of the internal combustion engine. These inlet and outlet valves are controlled by camshafts, with two camshafts regularly being used in the case of combustion machines having more than two valves per cylinder.

In order to improve the operating behavior of a combustion machine, it is known practice for the valve control times of the inlet and/or outlet valves to be changed by virtue of the phase angles of the camshafts controlling the valves being adjusted. For this purpose, the respective camshaft is rotated by a defined angle, the phase angle, through the use of a phase adjuster with respect to a drive wheel via which the camshaft is rotationally driven, with the result that the valve control times of the valves activated thereby can be adjusted in the "advanced" or "retarded" direction.

German Patent Application Publication No. DE 10 2013 223 112 A1 discloses an internal combustion engine having a camshaft whose phase angle with respect to the crankshaft driving the camshaft via a belt can be changed through the use of a phase adjuster. The phase adjuster includes a vaned rotor connected to the camshaft and also a housing which forms the belt wheel of the camshaft. Between the vaned rotor and the housing of the phase adjuster there are formed a plurality of pressure chambers which, controlled by a phase adjuster valve, can be filled as required with oil in order to rotate the vaned rotor (and hence the camshaft) relative to the housing (and hence the crankshaft) with the aim of changing the valve control times. The phase adjuster valve is arranged centrally within the vaned rotor and includes a valve body which is axially displaceable with respect to the axis of rotation of the phase adjuster or of the camshaft and which, in dependence on its respective position, frees or closes inflow and outflow ducts of the pressure chambers. A displacement of the valve body is brought about through the use of an electromechanical actuator which is screwed externally to a cover of the cylinder head of the internal combustion engine, with a main part of the actuator, including an actuating pin, which contacts the valve body by one end, extending through a through-opening of the cover. A tubular portion of the main part extends in the longitudinal axial direction over an end portion of a tubular portion of the housing of the phase adjuster, with the result that they delimit an interior space filled partially with the oil used for actuating the phase adjuster. A radial shaft sealing ring is arranged between the two tubular portions in order to seal this interior space with respect to the surroundings.

A disadvantage which results from the design of the internal combustion engine known from German Patent Application Publication No. DE 10 2013 223 112 A1 lies in the fact that, when the cover of the cylinder head is removed, for example for maintenance of the belt drive, the actuator has to be removed as well, with the result that the interior space formed between the actuator and the housing of the phase adjuster is exposed. Since the interior space is filled at least partially with the oil provided for actuating the phase adjuster, this is associated with a considerable amount of effort. In addition, refitting the cover and hence the actuator necessarily involves a considerable amount of effort in order that a sufficiently exact coaxial orientation of the actuator relative to the phase adjuster is achieved again. This is required for a good sealing effect of the radial shaft sealing ring.

Moreover, internal combustion engines comparable thereto in multiple embodiments are described in International Publication No. WO 2015/000476 A1. Here, the respective actuator can be fastened externally to a belt box or a cylinder head housing of the internal combustion engine and extend partially through a through-opening in the belt box or the cylinder head housing. In the case of another embodiment described in International Publication No. WO 2015/000476 A1, there is provision for the sealing element to be arranged not between the housing of the phase adjuster and the actuator but between the housing of the phase adjuster and a portion of the belt box or of the cylinder head housing.

SUMMARY OF THE INVENTION

It is accordingly an object of the invention to provide an internal combustion engine and a method for assembling an internal combustion engine which overcome the above-mentioned disadvantages of the heretofore-known internal combustion engines and methods for assembling an internal combustion engine of this general type and which allow a simple maintenance of the mechanism (transmission mechanism) provided for the drive of the camshaft(s), which mechanism can be configured in particular in the form of a belt drive. It is in particular an object of the invention to provide a configuration of an internal combustion engine of the type in question that enables good accessibility to the mechanism covered by a cover for maintenance purposes, without the actuator for the phase adjuster having to be disassembled to achieve this.

With the foregoing and other objects in view there is provided, in accordance with the invention, an internal combustion engine including:
an engine housing;
a valve drive including a camshaft, a phase adjuster operatively connected to the camshaft, and an actuator for actuating the phase adjuster;
the phase adjuster and the actuator delimiting an interior space;
a cover surrounding the phase adjuster;
an actuator holder for fastening the actuator to the engine housing, the actuator holder being surrounded by the cover; and
a sealing element disposed between the phase adjuster and the actuator holder, the sealing element sealing the interior space against liquid discharge.

In other words, according to the invention there is provided an internal combustion engine having an engine housing, a valve drive, which includes a camshaft, a phase adjuster operatively connected to the camshaft and an actuator for actuating the phase adjuster, wherein (at least) the phase adjuster and the actuator delimit an interior space, and having a cover surrounding the phase adjuster, is characterized, on the one hand, by an actuator holder surrounded by the cover and intended for fastening the actuator to the engine housing. Furthermore, there is provision that the interior space delimited (at least) by the phase adjuster and the actuator (and possibly also by the actuator holder) is sealed against liquid discharge through the use of a sealing element disposed between the phase adjuster and the actuator holder.

Accordingly, there is provision according to the invention that, other than provided in the described prior art, the function of holding the actuator, on the one hand, and of covering the phase adjuster and, where appropriate, all or part of the mechanism (transmission mechanism) driving the camshaft, on the other hand, is not to be implemented through the use of a single or integral component, but separate components are to be used for both functions. This allows advantages to be achieved. In particular, it is thus made possible to remove the cover for maintenance purposes without the actuator also having to be removed in this respect. A further advantage of the configuration according to the invention of an internal combustion engine lies in the fact that the cover, since it does not have to perform a holding function for the actuator, can be formed comparatively simply, in particular with structurally relatively little loadability. This can in particular also allow the cover to be formed cost-effectively from plastic. Overall, it is thereby possible also to achieve weight advantages by comparison with a structurally more highly loadable cover which may be formed from a metal and which, as is known from the prior art, performs the holding function for the actuator.

The engine housing can in particular include a cylinder housing (crankcase) and/or a cylinder head housing of the internal combustion engine.

The camshaft can be an inlet camshaft which is provided exclusively for actuating inlet valves, an outlet camshaft which is provided exclusively for actuating outlet valves, or a so-called mixed camshaft which is provided for actuating both inlet and outlet valves.

The phase adjuster can be configured to be single- or double-acting. A double-acting phase adjuster can interact, for example, with a so-called shaft-in-shaft camshaft in which an outer camshaft receives an inner camshaft, the camshafts actuating different gas-exchange valves and the cams of the inner camshaft extending through through-openings in the outer camshaft in order to be able to contact the corresponding gas-exchange valves. Such a shaft-in-shaft camshaft is particularly suitable for use as a mixed camshaft.

The cover which surrounds at least the phase adjuster and the actuator holder (in each case completely or at least partially) can preferably be releasably connected to the engine housing. Alternatively, the cover can also be (preferably) releasably connected to at least one other component of the internal combustion engine and/or of a combustion machine including the internal combustion engine and/or of a motor vehicle, in particular a wheel-based motor vehicle (preferably a passenger car or truck), incorporating the internal combustion engine.

The sealing element can preferably be a radial shaft sealing ring since it makes it possible to achieve in a relatively cost-effective manner a good sealing of a gap formed between a static component, here the actuator holder, and a moving component, here the phase adjuster. In this case, the sealing bearing surface of the radial shaft sealing ring can contact either the phase adjuster or the actuator holder. Alternative embodiments of the sealing element can also be used. In particular, an embodiment of the sealing element as an axial shaft sealing ring can also be provided.

The sealing element can also be integrated into the phase adjuster and/or the actuator holder. For example, an actuator holder (possibly composed of plastic) can be provided with a molded-on sealing element.

Sealing of the interior space delimited at least by the phase adjuster and the actuator can be in particular expedient or necessary because it can constitute a portion of a hydraulic supply path for the phase adjuster and can thus be at least partially filled with a liquid, for example an oil.

The term "actuator" is to be understood according to the invention as meaning an actuating device which can be activated (in particular by a control device) and which includes an actuating element which is moved as a result of the activation, this movement of the actuating element leading to an adjustment of the phase adjuster. The actuator can be, for example, of electromechanical design, in particular electromagnetic design, with the result that the movement of the actuating element can be based in particular on the generation of a magnetic field obtained in dependence on the activation. However, it is also possible, for example, for the actuator to be able to be actuated hydraulically or pneumatically.

According to another feature of the invention, the cover has a through-opening formed therein, wherein the actuator and/or the actuator holder extends through the through-opening.

In a preferred embodiment of the internal combustion engine according to the invention, there can be provision that the cover has a through-opening through which the actuator extends (completely or at least partially) and/or through which the actuator holder extends (partially). Here, there can preferably be provision that a gap formed between the cover and the actuator and/or the actuator holder is at least sealed by virtue of the fact that these elements contact one another (as far as possible with full-surface contact) in an overlapping region. Where appropriate, there can also be provision to integrate a sealing element, for example an O-ring, in this overlapping region should particular requirements be placed on the protecting function of the cover. The through-opening in the cover can make it possible in particular for one or more connection pieces, such as plug connectors, for example, to be routed out of the space surrounded by the cover, thereby enabling a simple connection of the actuator to an energy source, for example an electric, pneumatic or hydraulic energy source, providing the energy for actuation thereof, and/or to a control device used for activating the actuator.

According to another feature of the invention, the through-opening is dimensioned such that the cover can be dismounted without dismounting the actuator and/or the actuator holder.

Thus, in the case of such an embodiment of an internal combustion engine according to the invention, there can then be further provision that the through-opening is dimensioned in such a way that the cover can be disassembled (dismounted) without disassembling the actuator and/or the actuator holder, with the result that a disassembly of the cover is possible even without disassembling the actuator.

A further relevant advantage which can result from the configuration according to the invention of an internal combustion engine lies in the fact that a good orientation or alignment of the actuator relative to the phase adjuster can be achieved through the use of a separate actuator holder in a relatively simple manner. This results from the preferably provided exclusive function of the actuator holder for fastening the actuator on the engine housing that allows it to be designed to be relatively small and as a statically advantageous carrying frame. By contrast thereto, it is necessary, with the use known from the prior art of the cover also as a support for the actuator, to provide a rigid dimensioning for the relatively large and in particular also large-area cover in order to permanently ensure a sufficiently exact positioning of the actuator relative to the phase adjuster.

A permanently optimally exact orientation of the actuator holder with respect to the phase adjuster can be relevant in particular for a sufficient sealing effect of the sealing element arranged between these components. This applies in particular because the phase adjuster constitutes a component which is functionally moved during operation of the internal combustion engine, whereas the actuator holder is functionally not moved.

According to another feature of the invention, the phase adjuster has a phase adjuster valve with a valve body; and the valve body is displaceable coaxially or parallel to an axis of rotation of the camshaft.

According to a further feature of the invention, the actuator has an actuating element; and the actuating element is displaceable coaxially or parallel to an axis of rotation of the camshaft.

Moreover, a permanently optimally exact orientation of the actuator holder with respect to the phase adjuster can be particularly relevant when, as preferably provided, the internal combustion engine has a phase adjuster valve integrated centrally in the phase adjuster. Such a phase adjuster valve can include a valve body which is displaceable coaxially or parallel to an axis of rotation of the camshaft. Here, this valve body can furthermore be preferably actuated through the use of an actuating element of the actuator that is displaceable coaxially or parallel to an axis of rotation of the camshaft. Since the valve body of the phase adjuster valve can be rotationally driven during operation of the internal combustion engine, whereas the actuating element of the actuator does not simultaneously perform a corresponding rotational movement, an optimally exact orientation of the actuator holder and hence of the actuator with respect to the phase adjuster makes it possible to achieve a contact between the valve body and the actuating element that is advantageous in terms of wear.

According to another feature of the invention, the phase adjuster and/or the actuator holder has a fitting surface; and the fitting surface encircles an axis of rotation of the camshaft.

In a further preferred embodiment of the internal combustion engine according to the invention, there can thus be provision that the phase adjuster and/or the actuator holder (each) have/has a fitting surface which encircles the axis of rotation of the camshaft. This fitting surface or these fitting surfaces can advantageously be used for an initial orientation of the actuator holder and hence of the actuator relative to the phase adjuster.

With the objects of the invention in view there is also provided, a method for assembling an internal combustion engine, the method including:

providing an engine housing, a valve drive including a camshaft, a phase adjuster operatively connected to the camshaft, and an actuator for actuating the phase adjuster;

providing an actuator holder for fastening the actuator to the engine housing, the actuator holder having a fitting surface encircling an axis of rotation of the camshaft;

plugging the actuator holder with the fitting surface of the actuator holder onto a first peripheral mating fitting surface of an assembly tool and then plugging the assembly tool, which carries the actuator holder, with a second peripheral mating fitting surface of the assembly tool onto a fitting surface of the phase adjuster;

providing a sealing element disposed between the phase adjuster and the actuator holder such that an interior space delimited by the phase adjuster and the actuator is sealed against liquid discharge; and providing a cover for surrounding the actuator holder and the phase adjuster.

Another mode of the invention includes fastening the actuator holder to a fastening portion of the engine housing by using a fastening configuration that allows a fastened positioning of the actuator holder relative to the fastening portion of the engine housing within a given tolerance-compensating range with respect to an orientation radially to an axis of rotation of the camshaft.

Another mode of the invention includes providing a fastening element extending through a through-opening of the actuator holder and into a receiving opening of a fastening portion of the engine housing, wherein the through-opening of the actuator holder and/or the receiving opening of the fastening portion of the engine housing has an oversize with respect to a portion of the fastening element selected from the group including a portion extending through the through-opening and a portion extending into the receiving opening for allowing a fastened positioning of the actuator holder relative to the fastening portion of the engine housing within a given tolerance-compensating range with respect to an orientation radially to an axis of rotation of the camshaft.

Another mode of the invention includes providing fastening elements extending through respective through-openings of the actuator holder and into respective receiving openings of a fastening portion of the engine housing, wherein the through-openings and/or the receiving openings have an oversize with respect to a respective portion of the fastening elements wherein the respective portion of the fastening elements is selected from the group including a respective portion extending through a respective one of the through-openings and a respective portion extending into a respective one of the receiving openings for allowing a fastened positioning of the actuator holder relative to the fastening portion of the engine housing within a given tolerance-compensating range with respect to an orientation radially to an axis of rotation of the camshaft.

Another mode of the invention includes providing a dry-running belt drive between a belt wheel of the camshaft and a belt wheel of a crankshaft.

In this respect, there can be provision, in a method according to the invention for assembling such an internal combustion engine, that the actuator holder is plugged by way of its fitting surface onto a first peripheral mating fitting surface of an assembly tool and then the assembly tool bearing the actuator holder is plugged by way of a second peripheral mating fitting surface onto the fitting surface of the phase adjuster. A further advantage of the relatively small design of the actuator holder made possible by the configuration according to the invention of an internal combustion engine then results from the fact that there is no requirement for a nonadvantageous handling of a relatively large cover which is possibly not particularly rigid and which possibly has to be fastened at many fastening points and which additionally incorporates an actuator which must be oriented relatively exactly to the phase adjuster.

According to another feature of the invention, a fastening configuration for fastening the actuator holder to a fastening portion of the engine housing is provided, the fastening configuration allowing a fastened positioning of the actuator holder relative to the fastening portion of the engine housing within a given tolerance-compensating range with respect to an orientation radially to an axis of rotation of the camshaft.

An advantageous orientation of the actuator holder relative to the phase adjuster can preferably be achieved in that a fastening configuration for fastening the actuator holder to a fastening portion of the engine housing is provided which allow a fastened positioning of the actuator holder relative to the fastening portion of the engine housing within a defined tolerance-compensating range with respect to the orientation radially to an axis of rotation of the camshaft.

According to another feature of the invention, the actuator holder has a through-opening formed therein; the engine housing has a fastening portion with a receiving opening formed therein; a fastening element extends through the through-opening of the actuator holder and into the receiving opening of the fastening portion of the engine housing; the through-opening of the actuator holder and/or the receiving opening of the fastening portion of the engine housing has an oversize with respect to a portion of the fastening element selected from the group including a portion extending through the through-opening and a portion extending into the receiving opening; and the fastening element and the through-opening of the actuator holder allow a fastened positioning of the actuator holder relative to the fastening portion of the engine housing within a given tolerance-compensating range with respect to an orientation radially to an axis of rotation of the camshaft.

According to another feature of the invention, the actuator holder has through-openings formed therein; the engine housing has a fastening portion with receiving openings formed therein; fastening elements extend through respective ones of the through-openings of the actuator holder and into respective ones of the receiving openings of the fastening portion of the engine housing; the through-openings and/or the receiving openings have an oversize with respect to a respective portion of the fastening elements wherein the respective portion of the fastening elements is selected from the group including a respective portion extending through a respective one of the through-openings and a respective portion extending into a respective one of the receiving openings; and the fastening elements and the through-openings of the actuator holder allow a fastened positioning of the actuator holder relative to the fastening portion of the engine housing within a given tolerance-compensating range with respect to an orientation radially to an axis of rotation of the camshaft.

The fastening configuration can be formed in a structurally simple manner by virtue of the fact that one or more through-openings in the actuator holder and one or more fastening elements extending through the through-openings of the actuator holder and into receiving openings of the engine housing are provided, wherein the through-openings of the actuator holder and/or the receiving openings each have an oversize with respect to the portions of the fastening elements that extend through the openings. With particular preference, the fastening elements can be formed as screws which engage in internal threads of the receiving openings of the engine housing. An oversize of the through-openings of the actuator holder by comparison with the outside diameters of the (threaded) bolts of the screws can allow, within certain limits, a displacement in the radial directions with respect to the axis of rotation of the camshaft for the purpose of an optimally exact orientation of the actuator holder relative to the phase adjuster until the screws have been tightened firmly enough for a fastened positioning of the actuator holder to be achieved by a clamping fixing between the engine housing and the screw heads.

According to another feature of the invention, a crankshaft with a belt wheel is provided; the camshaft has a belt wheel; and a dry-running belt drive between the be wheel of the camshaft and the belt wheel of the crankshaft is provided.

The configuration according to the invention of an internal combustion engine particularly has advantages when it has a dry-running belt drive for transmitting drive power between a belt wheel of a crankshaft of the internal combustion engine and a belt wheel of the camshaft, with the belt wheel of the camshaft being able in particular to incorporate the phase adjuster. This applies because in particular, in the case of such a dry-running belt drive for which consequently no lubrication with a lubricant supplied for this purpose is provided, a sealing of the interior space which is filled, where appropriate, with a liquid and in particular oil and is delimited by the phase adjuster and the actuator is relevant.

The indefinite articles ("a" and "an"), in particular in the patent claims and in the description explaining the patent claims in general, should be understood as such and not as numerals. Components correspondingly substantiated therewith should therefore be understood as meaning that the components are present at least once and may be present more than once.

Although the invention is illustrated and described herein as embodied in an internal combustion engine and method for assembling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWINGS

DETAILED DESCRIPTION OF THE INVENTION

Figure 2:
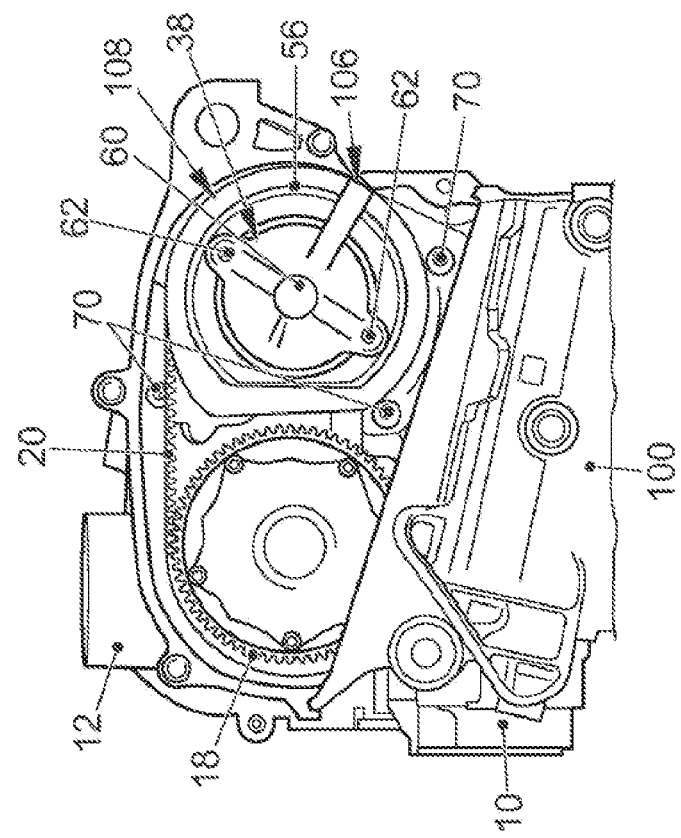
FIG. 2 is a view of the internal combustion engine according to FIG. 1 with the cover for the camshaft drive removed.
Figure 1:
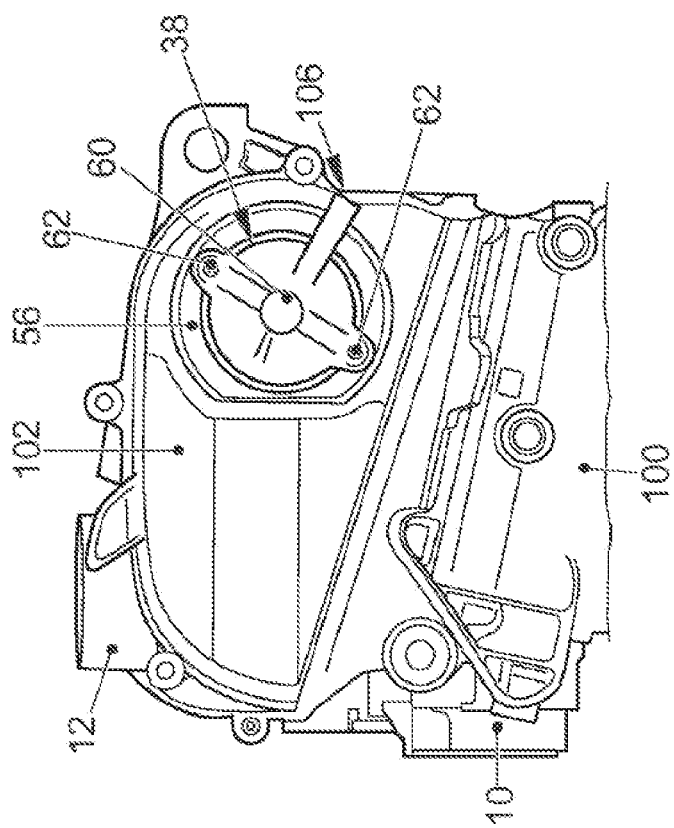
FIG. 1 is a partial view of an internal combustion engine according to the invention from the front.

The internal combustion engine illustrated in the drawings is configured as a reciprocating piston engine in a known manner. Accordingly, it has an engine housing which includes a cylinder housing 10 and a cylinder head housing 12 connected to the cylinder housing 10. Within the cylinder housing 10 there are formed one or more cylinders (not visible) in each of which a piston (not shown) is movably guided. The cylinder walls delimit, together with the upper sides of the pistons and combustion chamber roofs formed by the cylinder head housing, combustion chambers in which a fuel-fresh gas mixture is combusted at staggered intervals in a known manner. The movements of the pistons produced by the combustions in the combustion chambers are transmitted via connecting rods to a crankshaft which is rotationally driven in this manner.

For a controlled introduction of fresh gas or of a fuel-fresh gas mixture into the combustion chambers and for a controlled discharge of the exhaust gas generated by the combustions, gas-exchange valves (not visible) which are actuated by a valve drive are integrated into the cylinder head of the internal combustion engine. In the exemplary embodiment, illustrated in the drawings, of an internal combustion engine according to the invention, this valve drive includes two camshafts, of which one, also referred to below as the inlet camshaft 14, actuates all the inlet valves, and the other camshaft, also referred to below as the outlet camshaft 110, actuates all the outlet valves. The camshafts are driven via a toothed-belt drive by the crankshaft. For this purpose, the toothed-belt drive in each case includes a toothed-belt wheel 16, 18 which is connected to each of the camshafts and to the crankshaft for conjoint rotation therewith, tensioning and guide rollers (not visible) and a toothed belt 20 which is guided over the toothed-belt wheels 16, 18 and the tensioning and guide rollers.

In the exemplary embodiment, illustrated in the drawings, of an internal combustion engine according to the invention, a phase adjuster 22 is provided for the inlet camshaft. The phase adjuster makes it possible for the control times for the inlet valves to be changed. This can serve, for example, to operate the internal combustion engine intermittently in a so-called Miller combustion process.

Figure 11:
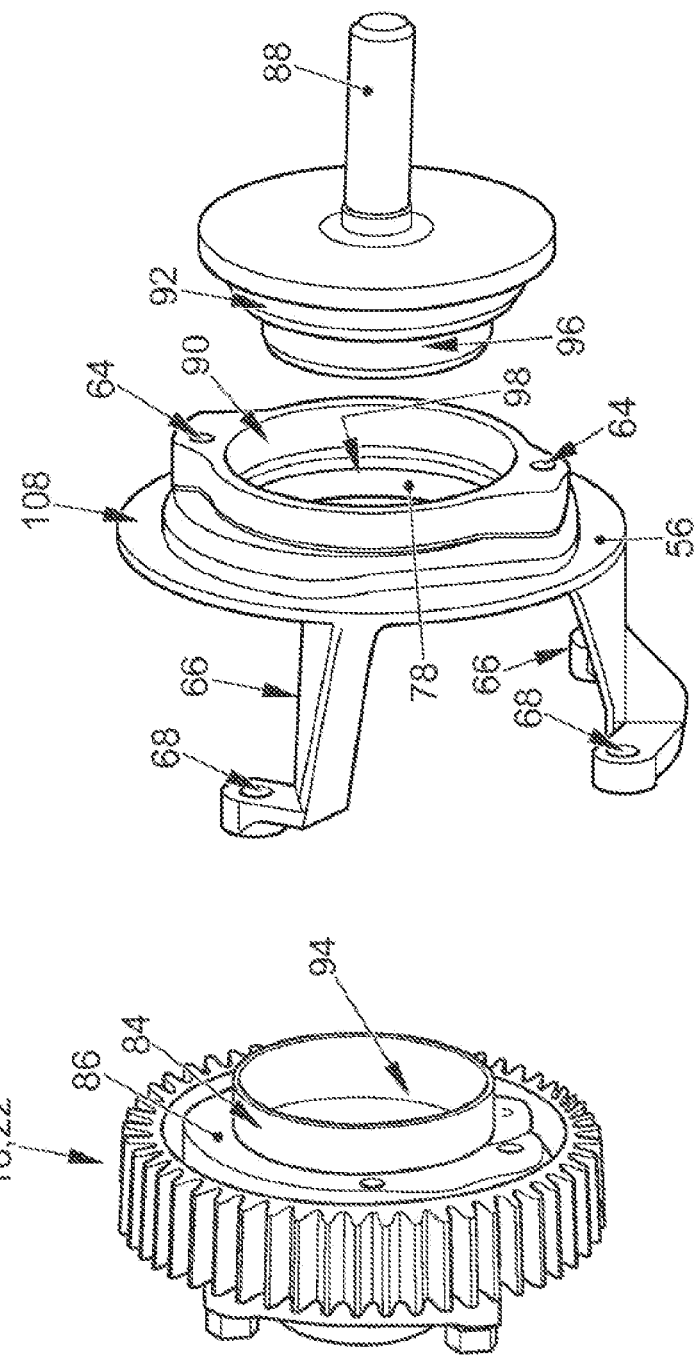
FIG. 11 is a perspective view of the phase adjuster, the actuator holder and the tool used for assembling the actuator holder in accordance with the invention.

The phase adjuster 22 is integrated in a known manner (cf. for example DE 10 2013 223 112 A1) into the toothed-belt wheel 16 of the inlet camshaft 14 and includes a vaned rotor 24 which is connected to the inlet camshaft 14 for conjoint rotation therewith and which is arranged so as to be rotatable within certain limits inside a stator 26 of the phase adjuster 22. On its substantially cylindrical outer surface, the stator 26 forms a toothed contour for engagement with the teeth of the toothed belt 20 (cf. FIG. 11). Between the vaned rotor 24 and the stator 26 of the phase adjuster 22 there are formed a plurality of pressure chambers (not visible) which, controlled by a phase adjuster valve 28, can be filled in a targeted manner with a liquid, in particular an oil, in order to rotate the vaned rotor 24 within the stator 26 in a defined manner, with the result that, in accordance with the aim of changing the control times of the inlet valves, the phase angle between the inlet camshaft 14 connected to the vaned rotor 24 and the stator 26 in rotary drive connection with the crankshaft via the toothed belt 20 is changed.

Figure 3:
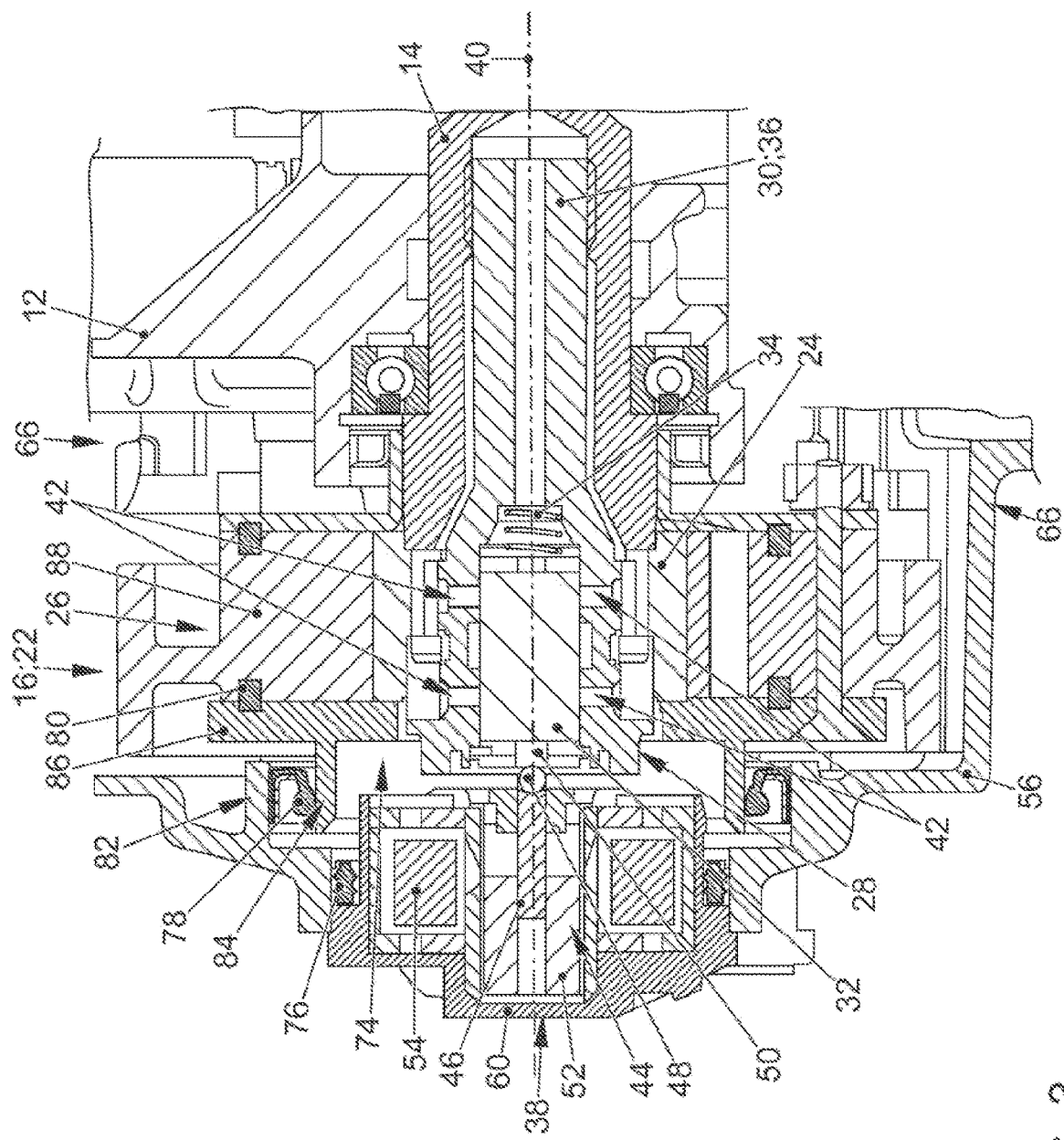
FIG. 3 is a longitudinal sectional view of a portion of the internal combustion engine according to FIG. 2 in accordance with the invention.
Figure 4:
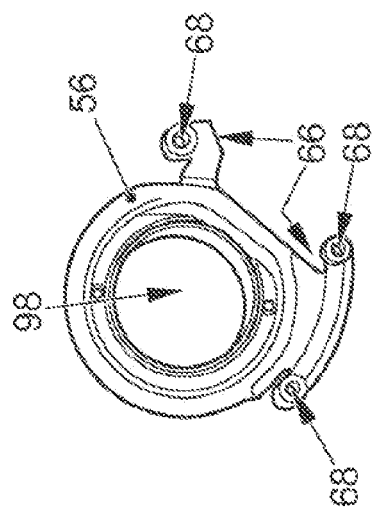
FIG. 4 is a perspective view of the cover for the camshaft drive in accordance with the invention.

The phase adjuster valve 28 is integrated into a central screw 30 through the use of which the toothed-belt wheel 16 integrating the phase adjuster 22 is connected to the inlet camshaft 14. The phase adjuster valve 28 includes a valve body 32 which is illustrated in simplified form in FIG. 3, which valve body is urged through the use of a preloaded spring element 34 in the direction of an end position (the left one in FIG. 3) and the position thereof within a valve housing 36 formed by the central screw 30 can be changed through the use of an actuator 38. Here, the valve body 32 is displaceable along the axis of rotation 40 of the inlet camshaft 14. In dependence on the position of the valve body 32, the latter frees or closes inflow and outflow openings 42 which are integrated into the valve housing 36, with the result that the filling and emptying of the pressure chambers of the phase adjuster 22 can be controlled.

The actuator 38 includes an actuating element 44 having an actuating pin 46 in whose free end there is integrated a ball 48 which at its end side contacts an end of an axial element 50 of the valve body 32. The other end of the actuating pin 46 is fixedly connected to an armature 52 which is mounted so as to be displaceable along the axis of rotation 40 of the inlet camshaft 14 within the actuator 38. A displacement of the armature 52, and hence of the entire actuating element 44 and consequently also of the valve body 32, in the direction (to the right in FIG. 3) which leads to an increasing preloading of the spring element 34 is moved electromagnetically. For this purpose, the actuator 38 includes a coil 54 which surrounds the guide for the armature 52 and which can be correspondingly supplied with electrical voltage by a control device (not shown), for example the engine controller, of the internal combustion engine.

Figure 5:
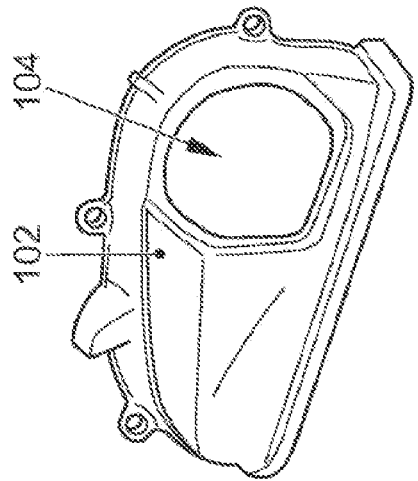
FIG. 5 is a first perspective view of the actuator holder of the internal combustion engine with a radial shaft sealing ring in accordance with the invention.
Figure 7:
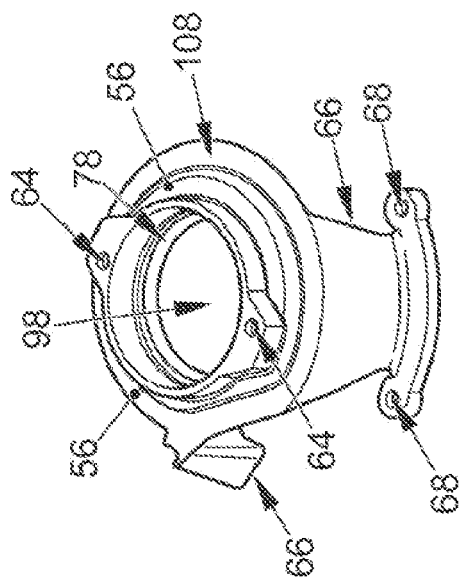
FIG. 7 is a perspective view of the actuator of the internal combustion engine in accordance with the invention.
Figure 8:
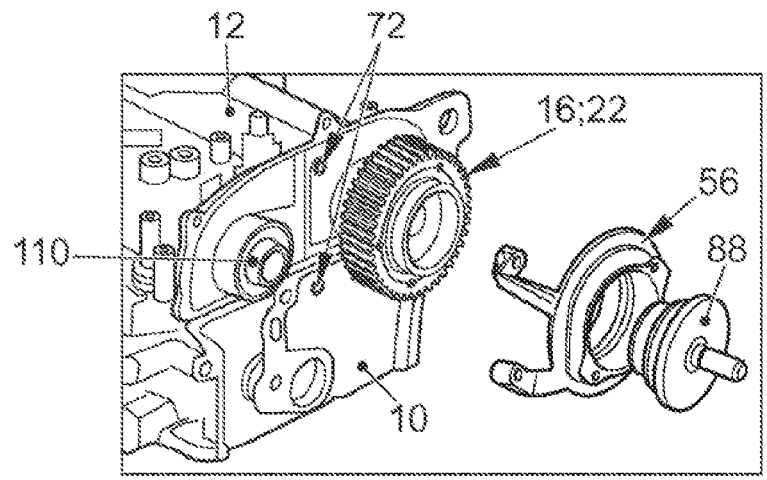
FIG. 8 is a partial perspective view of the internal combustion engine illustrating a first step during the assembly of the actuator holder in accordance with the invention.
Figure 9:
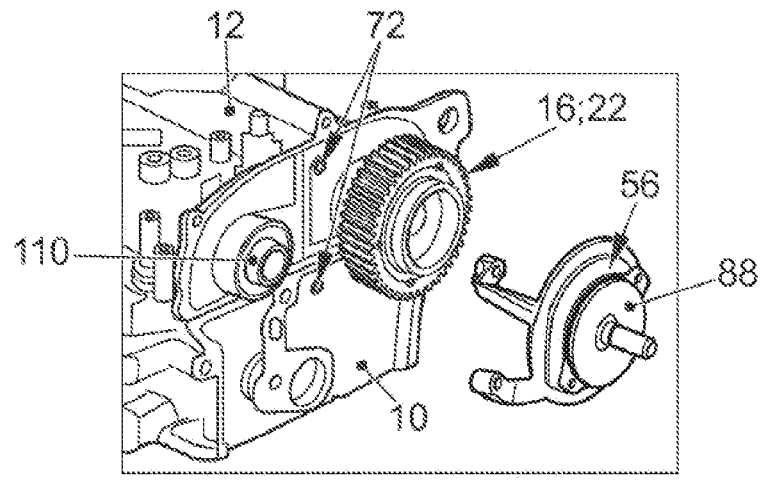
FIG. 9 is a partial perspective view of the internal combustion engine illustrating a second step during the assembly of the actuator holder in accordance with the invention.
Figure 10:
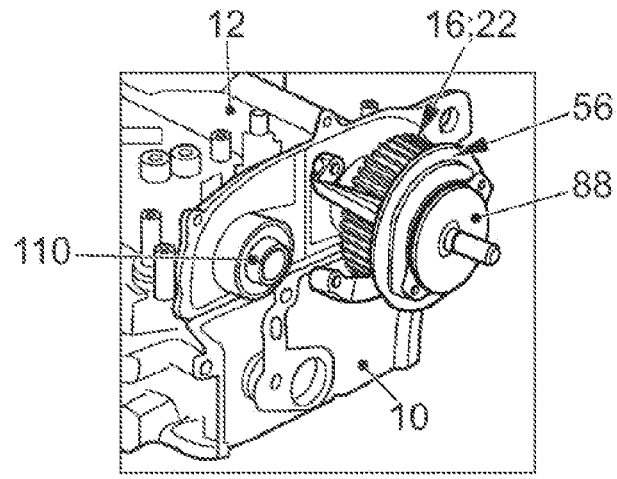
FIG. 10 is a partial perspective view of the internal combustion engine illustrating a third step during the assembly of the actuator holder in accordance with the invention.

The actuator 38 is connected through the use of screw connections to an actuator holder 56 which is formed, for example, as a cast aluminum component. For this purpose, a housing 60 of the actuator 38 has through-openings 58 (cf. FIG. 7) through which there can extend threaded bolts of associated screws 62 which can be screwed into associated threaded openings 64 of the actuator holder 56 (cf. FIG. 5).

Figure 6:
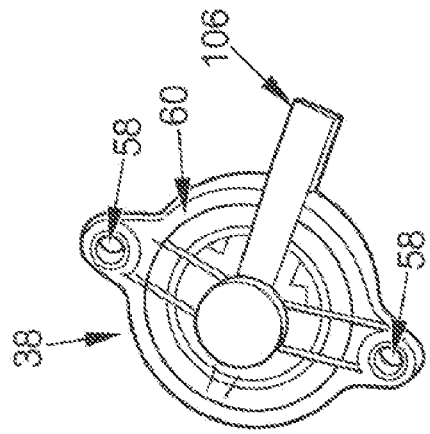
FIG. 6 is a second perspective view of the actuator holder according to FIG. 5 but without a radial shaft sealing ring.

The actuator holder 56 itself is likewise connected via screw connections to both the cylinder head housing 12 and to the cylinder housing 10 of the internal combustion engine. For this purpose, two fastening portions 66 of the actuator holder 56 have a total of three through-openings 68 (cf. FIG. 6) through which there can extend threaded bolts of associated screws 70 which can be screwed into associated threaded openings 72 of the cylinder head housing 12 and of the cylinder housing 10.

The fastening portions 66 are guided within a space enclosed by the toothed belt 20 from the actuator holder 56 to the cylinder head housing 12 and the cylinder housing 10. This makes it possible, even without disassembly of the actuator holder 56, to disassemble the toothed belt 20 or to assemble a new toothed belt 26.

An interior space 74 delimited by the phase adjuster 22, the central screw 30, the phase adjuster valve 28, the actuator 38 and the actuator holder 56 is partially filled with the liquid used for adjusting the phase adjuster 22. In order to seal this interior space 74 against liquid discharge, a plurality of sealing elements 76, 78, 80 are provided. In the case of the internal combustion engine illustrated, this sealing is of particular importance because the toothed-belt drive is designed to be dry-running and therefore a transfer of liquid from the interior space 74 into the region of the toothed-belt drive should be avoided as far as possible.

A first sealing element 74 is arranged between the housing 60 of the actuator 38 and the actuator holder 56. Since these components are not moved relative to one another during the operation of the internal combustion engine, this first sealing element 76 can be designed as a simple static sealing element, for example as an O-ring. A second sealing element 78 is arranged between an annular portion 82 of the actuator holder 56 that encircles the axis of rotation 40 of the inlet camshaft 14 and an annular portion 84 of a cover part 86, which is formed for example of steel, of the stator 26 of the phase adjuster 22, the annular portion 84 likewise encircling the axis of rotation 40 of the inlet camshaft 14. Since the stator 26 of the phase adjuster 22 is rotationally driven by the crankshaft during the operation of the internal combustion engine, while this does not apply for the actuator holder 56, the second sealing element 78 is designed as a dynamic sealing element, in the concrete exemplary embodiment as a radial shaft sealing ring. Furthermore, the interior space 74 is sealed through the use of a third, static sealing element 80 which is designed in particular as an O-ring and which is arranged between the cover part 86 and a basic body 88 of the stator 26 of the phase adjuster 22.

To obtain a permanently good sealing effect of the radial shaft sealing ring 78 pressed by its static outer side into the actuator holder 56, it is necessary to have as coaxial as possible an orientation of the inner surface, provided for contact with the radial shaft sealing ring 78, of the annular portion 82 of the actuator holder 56 with respect to the outer surface, provided for contact with a bearing surface of the radial shaft sealing ring 78, of the annular portion 84 of the cover part 86. This is ensured by the use of a suitable assembly tool 88 within the context of assembling the internal combustion engine, specifically within the context of fastening the actuator holder 56 on the engine housing. In this respect, according to FIGS. 8 to 11, at first the actuator holder 56 is plugged onto the assembly tool 88, with an (inner) fitting surface 90 of the actuator holder 56 (having a diameter of for example 65 mm) contacting a first (outer) mating fitting surface 92 of the assembly tool 88. The unit formed by the assembly tool 88 and the actuator holder 56 is then plugged onto the phase adjuster 22, with an (inner) fitting surface 94 of the phase adjuster 22 (having a diameter of for example 50 mm), which fitting surface is arranged on the inner side of the annular portion 84 of the cover part 86, contacting a second (outer) mating fitting surface 96 of the assembly tool 88. The actuator holder 56 can then be screwed in the oriented position to the engine housing. Here, the through-openings 68 of the actuator holder 56 which are designed with an oversize with respect to the outside diameters of the threaded bolts of the screws 70 ensure an orientation of the actuator holder 56 within a tolerance-compensating range.

Since all the (mating) fitting surfaces have been manufactured with predetermined, relatively narrow tolerances, it is possible in this way to ensure that not only the inner surface, provided for contact with the radial shaft sealing ring 78, of the annular portion 82 of the actuator holder 56 is sufficiently exactly coaxial to the outer surface, likewise provided for contact with the radial shaft sealing ring 78, of the annular portion 84 of the cover part 86, but also to ensure an exact coaxial orientation of the (inner) fitting surface 90 of the actuator holder 56 with respect to the axis of rotation 40 of the inlet camshaft 14 and hence also with respect to the axis of movement of the valve body 32 of the phase adjuster valve 28. Since this (inner) fitting surface 90 of the actuator holder 56 delimits a through-opening 98 of the actuator holder 56 that serves for receiving the actuator 38, it is thereby also possible to ensure a relatively exact coaxial orientation of the actuating pin 46 of the actuator 38 relative to the axial element 50 of the valve body 32, which axial element is rotationally driven during the operation of the internal combustion engine, thus making it possible to afford advantages in terms of wear.

For protection against contamination and, moreover, for safety reasons, the toothed-belt drive of the internal combustion engine runs in a substantially completely closed-off receiving space. In this respect, a covering of the toothed-belt drive is obtained, on the one hand, through the use of an engine bracket 100 which also serves for fastening the internal combustion engine in an engine compartment of a motor vehicle is provided. The engine bracket 100 terminates approximately at the level of the parting plane between the cylinder housing 10 and the cylinder head housing 12. The portion of the toothed-belt drive that is not covered by the engine bracket 100 can be covered through the use of a separate cover 102 which can be formed, for example, from plastic and in particular as an injection-molded component, it being possible for the cover to be connected to the cylinder head housing 12 via screw connections. This cover 102 can be removed quickly and in a simple manner for maintenance purposes. Here, unlike in the prior art, the actuator 38 does not have to be removed as well since it is fastened through the use of the actuator holder 56 to the engine housing independently of the cover 102. This is advantageous because a removal of the actuator 38 would lead to an opening of the interior space 74 which is also delimited thereby and partially filled with liquid. Emptying and then refilling the liquid system incorporating this interior space 74 can thus be dispensed with when removing the cover 102.

The cover 102 includes a through-opening 104 within which a portion of the actuator 38 and of the actuator holder 56 are arranged in the assembled state of the cover 102. This has the advantage that the actuator 38 is also accessible when the cover 102 is assembled, i.e. when the cover 102 is in its mounted state. In particular, as a result, a plug connector 106 of the actuator 38 is also freely accessible, through the use of which the actuator 38 can be connected to the control device for energy supply and for activation. The through-opening 104 is dimensioned to be large enough for the cover 102 to be removable without the actuator 38 having to be disassembled. Here, the outer circumference of the actuator 38 (with the exception of a portion of the plug connector 106) is arranged completely within the clearance delimited by the through-opening 104 of the cover 102. By contrast, the actuator holder 56 has larger external dimensions in the portion which does not extend through the through-opening, which also serves to realize a sufficient sealing effect for the gap formed between the cover 102 and the actuator holder 56. For this purpose, an annular surface portion of the cover 102 that extends on the inner side of the cover around the through-opening 104 makes contact, as far as possible over its whole area, with a correspondingly annularly formed contact portion 108 of the actuator holder 56 that lies in one plane.

LIST OF REFERENCE CHARACTERS

- 10 Cylinder housing
- 12 Cylinder head housing
- 14 Inlet camshaft
- 16 Toothed-belt wheel of the inlet camshaft
- 18 Toothed-belt wheel of the outlet camshaft
- 20 Toothed belt
- 22 Phase adjuster
- 24 Vaned rotor
- 26 Stator
- 28 Phase adjuster valve
- 30 Central screw
- 32 Valve body
- 34 Spring element
- 36 Valve housing
- 38 Actuator
- 40 Axis of rotation of the inlet camshaft
- 42 Inflow or outflow opening
- 44 Actuating element
- 46 Actuating pin
- 48 Ball
- 50 Axial element
- 52 Armature
- 54 Coil
- 56 Actuator holder
- 58 Through-opening of the actuator
- 60 Housing of the actuator
- 62 Screw
- 64 Threaded opening of the actuator holder
- 66 Fastening portion of the actuator holder
- 68 Through-opening of the actuator holder
- 70 Screw
- 72 Threaded opening of the cylinder head housing or of the cylinder housing
- 74 Interior space
- 76 First sealing element
- 78 Second sealing element/radial shaft sealing ring
- 80 Third sealing element
- 82 Annular portion of the actuator holder
- 84 Annular portion of the phase adjuster
- 86 Cover part
- 88 Assembly tool
- 90 Fitting surface of the actuator holder
- 92 First mating fitting surface of the assembly tool
- 94 Fitting surface of the phase adjuster
- 96 Second mating fitting surface of the assembly tool
- 98 Through-opening of the actuator holder
- 100 Engine bracket
- 102 Cover
- 104 Through-opening of the cover
- 106 Plug connector of the actuator
- 108 Contact portion of the actuator holder
- 110 Outlet camshaft

What is claimed is:

1. An internal combustion engine comprising:
   an engine housing;
   a valve drive including a camshaft, a phase adjuster operatively connected to said camshaft, and an actuator for actuating said phase adjuster;
   said phase adjuster and said actuator delimiting an interior space;
   a cover surrounding said phase adjuster;
   an actuator holder for fastening said actuator to said engine housing, said actuator holder being surrounded by said cover; and
   a sealing element disposed between said phase adjuster and said actuator holder, said sealing element sealing said interior space against liquid discharge.

2. The internal combustion engine according to claim 1, wherein said cover has a through-opening formed therein, at least one of said actuator and said actuator holder extends through said through-opening.

3. The internal combustion engine according to claim 2, wherein said through-opening is dimensioned such that said cover can be dismounted without dismounting at least one of said actuator and said actuator holder.

4. The internal combustion engine according to claim 1, wherein:
   said phase adjuster has a phase adjuster valve with a valve body; and
   said valve body is displaceable coaxially to an axis of rotation of said camshaft.

5. The internal combustion engine according to claim 1, wherein:
   said phase adjuster has a phase adjuster valve with a valve body; and
   said valve body is displaceable parallel to an axis of rotation of said camshaft.

6. The internal combustion engine according to claim 1, wherein:
   said actuator has an actuating element; and
   said actuating element is displaceable coaxially to an axis of rotation of said camshaft.

7. The internal combustion engine according to claim 1, wherein:
   said actuator has an actuating element; and
   said actuating element is displaceable parallel to an axis of rotation of said camshaft.

8. The internal combustion engine according to claim 1, wherein:
   at least one of said phase adjuster and said actuator holder has a fitting surface; and
   said fitting surface encircles an axis of rotation of said camshaft.

9. The internal combustion engine according to claim 1, including a fastening configuration for fastening said actuator holder to a fastening portion of said engine housing, said fastening configuration allowing a fastened positioning of said actuator holder relative to said fastening portion of said engine housing within a given tolerance-compensating range with respect to an orientation radially to an axis of rotation of said camshaft.

10. The internal combustion engine according to claim 1, wherein:
    said actuator holder has a through-opening formed therein;
    said engine housing has a fastening portion with a receiving opening formed therein;
    a fastening element extends through said through-opening of said actuator holder and into said receiving opening of said fastening portion of said engine housing;
    at least one of said through-opening of said actuator holder and said receiving opening of said fastening portion of said engine housing has an oversize with respect to a portion of said fastening element selected from the group consisting of a portion extending through said through-opening and a portion extending into said receiving opening; and said fastening element and said through-opening of said actuator holder allow a fastened positioning of said actuator holder relative to said fastening portion of said engine housing within a given tolerance-compensating range with respect to an orientation radially to an axis of rotation of said camshaft.

11. The internal combustion engine according to claim 1, wherein:

said actuator holder has through-openings formed therein;

said engine housing has a fastening portion with receiving openings formed therein;

fastening elements extend through respective ones of said through-openings of said actuator holder and into respective ones of said receiving openings of said fastening portion of said engine housing;

at least one of said through-openings and said receiving openings have an oversize with respect to a respective portion of said fastening elements wherein said respective portion of the fastening elements is selected from the group consisting of a respective portion extending through a respective one of said through-openings and a respective portion extending into a respective one of said receiving openings; and said fastening elements and said through-openings of said actuator holder allow a fastened positioning of said actuator holder relative to said fastening portion of said engine housing within a given tolerance-compensating range with respect to an orientation radially to an axis of rotation of said camshaft.

12. The internal combustion engine according to claim 1, further including:

a crankshaft with a belt wheel;

said camshaft having a belt wheel; and a dry-running belt drive between said belt wheel of said camshaft and said belt wheel of said crankshaft.

13. A method for assembling an internal combustion engine, the method comprising:

providing an engine housing, a valve drive including a camshaft, a phase adjuster operatively connected to the camshaft, and an actuator for actuating the phase adjuster;

providing an actuator holder for fastening the actuator to the engine housing, the actuator holder having a fitting surface encircling an axis of rotation of the camshaft;

plugging the actuator holder with the fitting surface of the actuator holder onto a first peripheral mating fitting surface of an assembly tool and then plugging the assembly tool, which carries the actuator holder, with a second peripheral mating fitting surface of the assembly tool onto a fitting surface of the phase adjuster;

providing a sealing element disposed between the phase adjuster and the actuator holder such that an interior space delimited by the phase adjuster and the actuator is sealed against liquid discharge; and providing a cover for surrounding the actuator holder and the phase adjuster.

14. The method according to claim 13, which comprises fastening the actuator holder to a fastening portion of the engine housing by using a fastening configuration that allows a fastened positioning of the actuator holder relative to the fastening portion of the engine housing within a given tolerance-compensating range with respect to an orientation radially to an axis of rotation of the camshaft.

15. The method according to claim 13, which comprises providing a fastening element extending through a through-opening of the actuator holder and into a receiving opening of a fastening portion of the engine housing, wherein at least one of the through-opening of the actuator holder and the receiving opening of the fastening portion of the engine housing has an oversize with respect to a portion of the fastening element selected from the group consisting of a portion extending through the through-opening and a portion extending into the receiving opening for allowing a fastened positioning of the actuator holder relative to the fastening portion of the engine housing within a given tolerance-compensating range with respect to an orientation radially to an axis of rotation of the camshaft.

16. The method according to claim 13, which comprises providing fastening elements extending through respective through-openings of the actuator holder and into respective receiving openings of a fastening portion of the engine housing, wherein at least one of the through-openings and the receiving openings have an oversize with respect to a respective portion of the fastening elements wherein the respective portion of the fastening elements is selected from the group consisting of a respective portion extending through a respective one of the through-openings and a respective portion extending into a respective one of the receiving openings for allowing a fastened positioning of the actuator holder relative to the fastening portion of the engine housing within a given tolerance-compensating range with respect to an orientation radially to an axis of rotation of the camshaft.

17. The method according to claim 13, which comprises providing a dry-running belt drive between a belt wheel of the camshaft and a belt wheel of a crankshaft.

* * * * *